UNITED STATES PATENT OFFICE.

PAUL JULIUS AND FRITZ GÜNTHER, OF LUDWIGSHAFEN, GERMANY, ASSIGNORS TO BADISCHE ANILIN AND SODA FABRIK, OF LUDWIGSHAFEN, BAVARIA, GERMANY, A CORPORATION OF GERMANY.

RED AZO DYE.

SPECIFICATION forming part of Letters Patent No. 695,811, dated March 18, 1902.

Application filed December 23, 1901. Serial No. 87,002. (No specimens.)

*To all whom it may concern:*

Be it known that we, PAUL JULIUS, a subject of the Emperor of Austria-Hungary, and FRITZ GÜNTHER, a subject of the King of Prussia, German Emperor, both doctors of philosophy and chemists, residing at Ludwigshafen-on-the-Rhine, in the Kingdom of Bavaria, Germany, have invented new and useful Improvements in Red Azo Dyes, of which the following is a specification.

This invention relates to a new red azo dye. This new dye may be produced by suitable combination of diazotized 2-amido-1-naphthyl-methane sulfo-acid (which has hitherto not been prepared) with beta-naphthol. The salts or lakes of this new azo dye, containing calcium, barium, aluminium, lead, or the like, are practically insoluble in water, are of a red color having a bluish cast, and are practically unchanged in color by the action of ordinary acids and of light, and it is this combination of properties which promises to make this new dye of value in the arts, especially in the art of lake and pigment making.

The following is a description of the manner in which this new dye may be prepared. However, the invention is not limited to the proportions and conditions herein given. The parts are by weight. The temperature degrees are on the centigrade scale.

*A. Production of the new 2-amido-1-naphthyl-methane sulfo-acid.*—Rub up one hundred (100) parts of the sodium salt of 2-hydroxy-1-naphthyl-methane sulfo-acid (described in the German Patent No. 87,335) with one hundred and thirty-five (135) parts of water. To this result add ninety (90) parts of ammonia-water containing twenty (20) per cent. of ammonia, ($NH_3$.) Into this introduce sulfur dioxid until the mixture has become slightly acid to litmus-paper. Now add seventy (70) parts of ammonia-water containing twenty (20) per cent. of ammonia ($NH_3$) and heat up to one hundred and fifty (150°) to one hundred and sixty (160°) degrees in a closed vessel for about eight (8) hours. Dilute the paste so resulting with hot water until practically complete solution ensues, expel the excess of ammonia by heating, filter while hot, cool, and add hydrochloric acid containing about twenty-nine (29) per cent. of hydrochloric acid (HCl) until precipitation is complete. This precipitate may be purified, if desirable, by boiling it with water and carbonate of soda, filtering, and reprecipitating it from this filtrate by means of hydrochloric acid. In this manner the new 2-amido-1-naphthyl-methane sulfo-acid can be obtained. This new 2-amido-1-naphthyl-methane sulfo-acid may be recognized as follows: It is difficultly soluble in water. Its diazo compound gives a yellow solution with sulfuric acid containing about twenty (20) per cent. of sulfuric acid, ($H_2SO_4$,) which solution on boiling yields a white precipitate soluble in chloroform. Suitably combined with beta-naphthol the diazo compound yields a red coloring-matter whose sodium, calcium, barium, lead, and aluminium salts are quite insoluble in water.

*B. Production of the new dye from the acid producible according to Example A.*—Dissolve two hundred and thirty-seven (237) parts of 2-amido-1-naphthyl-methane sulfo-acid (one [1] molecular proportion) in two thousand (2,000) parts of water and fifty-five (55) parts of calcined carbonate of soda (about one-half [½] molecular proportion) and to this add a concentrated solution of sodium nitrate containing sixty-nine (69) parts of that salt, ($NaNO_2$,) (one molecular proportion.) Now introduce this mixture, stirring the meanwhile, into two hundred and fifty (250) parts of hydrochloric acid containing thirty-five (35) per cent. of hydrochloric acid (HCl) (about two and a half molecular proportions) which have previously been diluted with one hundred (100) parts of water. After the diazotation is completed introduce this mixture, stirring the meanwhile, into a solution of one hundred and fifty (150) parts of beta-naphthol (about one [1] molecular proportion) in one hundred and twenty-five (125) parts of caustic-soda lye containing thirty-five (35) per cent. of caustic soda (NaOH) (one molecular proportion) and add to this solution sixty (60) parts of calcined carbonate of soda (about one-half [½] molecular proportion) and five hundred (500) parts of water. Stir this mixture until the formation of dye is completed. This is usually accomplished in the course of from three (3) to four (4) hours. It is recommended to preserve this new azo dye in the form of a paste of any suitable strength.

In the dry and powdered state this new dye is a red powder. It gives a blue-violet solution with concentrated sulfuric acid containing about ninety-six (96) per cent. of sulfuric acid, ($H_2SO_4$.) This solution when diluted with ice-water gives a violet precipitate, which violet precipitate becomes red on treatment with carbonate of soda. In the form of its sodium salt this new dyestuff dissolves but little in cold water, and boiling water dissolves it, but with difficulty. This new dye dyes wool from the acid-bath a red shade. The salts or lakes containing calcium, barium, aluminium, or lead are of a red color and practically insoluble in water.

On suitable reduction with stannous chlorid and hydrochloric acid this new dye yields 2-amido-1-naphthyl-methane sulfo-acid, which may be recognized by the properties hereinbefore set forth.

What is claimed is—

As a new article of manufacture the azo dye which can be obtained from diazotized 2-amido-1-naphthyl-methane sulfo-acid and beta-naphthol, which dyes wool from the acid-bath a red shade and yields a blue-violet color with concentrated sulfuric acid, and on suitable reduction yields 2-amido-1-naphthyl-methane sulfo-acid.

In testimony whereof we have hereunto set our hands in the presence of two subscribing witnesses.

PAUL JULIUS.
FRITZ GÜNTHER.

Witnesses:
BERNHARD C. HESSE,
JACOB ADRIAN.